May 1, 1934.  R. ACRE  1,956,818

VACUUM PROCESS OF WELDING

Filed July 31, 1931

Inventor
Ray Acre

Patented May 1, 1934

1,956,818

UNITED STATES PATENT OFFICE 1,956,818

VACUUM PROCESS OF WELDING

Ray Acre, Wheaton, Ill.

Application July 31, 1931, Serial No. 554,361

20 Claims. (Cl. 29—189)

My invention relates generally to welding together into a single mechanically-integral metal bar, slab, rod, shaft, plate, armor-plate, sheet, tube, or the like, two or more originally separate elements differing from each other in physical or chemical composition, or in both.

My invention particularly relates to welding together the several separate elements required to constitute a laminated or plated ferrous article preferably of iron or steel of the general types mentioned, covered or faced on one or more sides with a layer or layers of ferrous metal of another composition or quality or with a non-ferrous metal.

Briefly, my invention consists in the production of articles of the above mentioned types by welding the same while the original elements thereof are in massive form, so that a considerable poundage of material can be assembled by a single weld, or in any case, handled in a single operation. It is designed, therefore, to effect the desired aggregation of originally separate elements into one laminated or plated element, simply, expeditiously, and economically, without the use of expensive special equipment, and yet with the result of yielding a product markedly cheaper than similar products, and superior to these in homogeneity, strength, adherence of the lamina one to another, and particularly in the mass of material and extent of surface to which the method or process of my invention can be applied.

The object of my invention is the perfect welding of the laminæ of such articles, and in the economy of materials and time in the production thereof.

In prior attempts to accomplish the welding in massive form of such articles as my process applies to the results invariably have been that the welds produced between the various lamina of the article have been imperfect excepting possibly in portions of the areas, with the consequent results that an excessive amount of material has had to be discarded to be wasted or reworked, and that the pieces not discarded have been of doubtful quality.

These failures have been due primarily to two causes. One cause is the production of scale between the welding surfaces by the oxidation of those surfaces by the air. Although at an initial period in the mass welding of such articles the spots of scale may be small, as the material is rolled or worked out the scale spots are simultaneously extended so that a minute spot of scale may eventually result in the production of a large blister in the finished product. A second cause is the buckling of the plates at the beginning of, or during subsequent, rolling or other working processes so that as these progress large areas of the contacting laminæ are not welded together.

In my process I have eliminated both of these causes of failure—the first, by eliminating all air so enabling the weld to take place in a vacuum, and, the second, by providing sliding or creepage space for some of the lamina as an effective preventative of buckling.

In describing my process I shall use three specific examples. The first is of a ferrous metal such as wrought iron or low-carbon steel coated with a non-ferrous metal such as nickel, for the production of rods or bars having particular adaptability for use in automobile bumpers and other articles. The second example is of ferrous metal such as low-carbon chrome-molybdenum steel coated or faced on one side with another ferrous metal such as high-carbon chrome-nickel steel, such compound plates having particular adaptability for use as armor plates for vessels. The third example is that of a ferrous metal such as low-carbon steel coated or faced on one or both sides with another ferrous metal of the corrosion-resistant types termed "stainless steels", this product finding utility in many varied uses in commerce wherein solid "stainless" steels are now employed.

It is to be understood that modifications of my invention to adapt the same to metals and combinations of metals other than those specifically mentioned may be made without departing from the spirit of my invention as defined in the claims appended hereto.

For detailed description of my invention reference is made to the accompanying drawing forming a part of this specification and in which like reference characters indicate corresponding parts throughout the several views, and in which Figures 1 and 2 show my invention as applied to the welding onto a relatively-thick bar or shaft of one quality of steel, of a relatively-thin coating of a non-ferrous metal or of another quality of steel;

Figure 1:
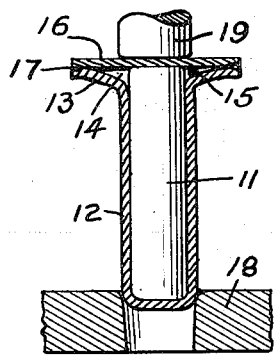

Referring now to Figure 1, numeral 11 designates a round or square bar of steel to be covered with a drawn sleeve 12 of, say, nickel. The surface of the bar 11 is polished clean and bright. The sleeve 12 is made cup-shaped of slightly-larger dimension than a press fit on the bar 11, and has its inner surface polished clean and bright similar to the preparation of the surface of the bar 11. The upper portion of the sleeve 12 is flanged out conically as shown at 13 and extends to a position flush with the end of the bar 11, thus providing an annular space 14 around the bar 11 when the sleeve 12 is placed thereon.

Within this annular space I place a gas-fixation material 15 such as magnesium ribbon or calcium pellets or granules, and over the open end of the conical portion 13 of the sleeve I place a sealing member 16 which I circumferentially weld to the conical portion 13 as shown at 17. In place of the fixation metal placed within the annular groove around the bar 11 I may use a sealing member 16 the inner surface of which has the property of absorbing and fixing the gases at a temperature lower than the sealing temperature of the metal of the bar 11 and the sleeve 13, or I may depend upon the elements 11 and 12 themselves to provide gas absorption and fixation characteristics.

By this construction I have formed an hermetically-sealed container with the surfaces to be welded entirely within such container, so that during the welding operation the cleansed surfaces may be pressed together without being affected at all appreciably by oxidation.

This assembly is now placed in a suitable furnace and heated to a temperature at which the fixation metal, for example, magnesium, reacts with the air, fixing the gases within the conical space between the bar 11 and the conical portion 13 of the sleeve 12, as well as any gases directly between 11 and 12, or occluded within or adherent to their surfaces. In most instances this temperature is well below the oxidation temperature of the metals that it is desired to weld, and in any case it is below the welding temperature, so that if the temperature of the assembly is slowly raised to welding temperature the gas-fixation effect will first cause absorption of the gases occluded in the surface of the elements 11 and 12 and thereafter maintain a relatively-high vacuum within the assembly at all times during the welding.

When the welding temperature is reached, the assembly is placed in the position shown on a ring die 18, and pressed through this die by the ram 19 of a suitable press. The ring die 18 being tapered and at its smallest dimension being made slightly smaller than the outside dimension of the sleeve 12, as the assembly is pressed through the die every portion of the sleeve is squeezed into perfect contact with and welded to the bar 11. Due to the differences in plasticity, and to other causes, there is likely to be a slight creep of the sleeve 12 along the bar 11 as the assembly is forced through the die 18.

The flexibility of the conical portion 13 of the sleeve 12 and of the portion of the sealing plate 16 that extends beyond the edges of the ram 19 permits a relatively large amount of creep between the sleeve 12 and the bar 11 without fracturing the hermetic seal of the assembly until after the full length of the bar 11 is forced through the die 18, so that the surfaces of the sleeve 12 and the bar 11 are brought into perfect welding contact in vacua throughout the entire length of the bar 11.

Figure 2:
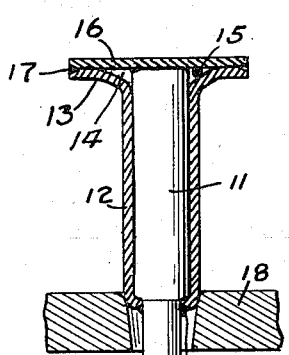

Referring now to Figure 2, this differs from Figure 1 only in that the assembled bar 11, sleeve 12, and plate 16 are pulled through the ring die 18 by the jaws 20, Figure 2, instead of being pushed through by the press ram 19, Figure 1. To allow this, the sleeve 12 is made with an open bottom instead of being cup-like, so that the extended portion 21, of the bar 11, can be provided for the jaws 20 to grip upon. This entails another sealing weld at 22, in addition to that at 17, to preserve the airtightness of the assembly. The advantage of pulling the assembly through the die instead of pushing it through is that a relatively long and slender rod may be made by this process without any possibility of the hermetic seal of the sleeve being broken, the sealing member 16 being allowed to move away from the end of the bar 11 and thus to allow for creepage as the bar 11 is pulled through the die 19.

I prefer this type of construction of the assembly to that shown in Figure 1 when the bar 11 and its covering 12 are relatively long, or when a condition of differential plasticity between 11 and 12 exists.

In each of these instances I have produced a bar of ferrous metal upon which is perfectly welded a layer of metal having different characteristics in chemical or physical composition, the welding of the surfaces being accomplished in the absence of air or gases that may contaminate the welding surfaces.

These resultant bars may then be subjected to further hot or cold working, to "normalizing" and heat treatments, to fabrication into finished articles, etc.

From the foregoing it will be seen that I have produced bars of material that may be drawn into rod and wire, and worked into line or other shafting, tough rather than brittle within its interior, but capable with or without subjection to simple tempering or normalizing operations, wholly without the cost and complication of carburization, of resisting corrosion, or of becoming exceedingly hard in an outer layer, to resist wear.

Obviously, though its principal application appears likely to be ferrous metals and alloys, my invention also is applicable to other metals. Indeed, it is applicable to the welding of any metals or combinations of metals that are weldable.

Figure 3:
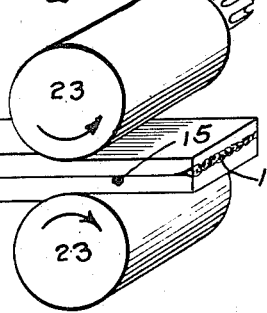
Figure 3 shows my invention in its simplest form as applied to the welding of a thick hard surfacing to a somewhat thicker tough backing, to produce an armor plate.

Figure 3 illustrates, in cross section and partial plan, a simple case of welding together two thick plates, 11 and 12, not too dissimilar in thickness or in coefficient of expansion and plasticity, and of substantially the same physical characteristics. To do this, it is necessary only to prepare the plates by polishing and cleaning their contact faces, followed by running the sealing weld 17 all around the four sides of the assembly—a suitable quantity of gas-fixation metal or chemical being placed as at 15 in a small cavity or drill hole, preferably near a corner which can be trimmed off subsequently. Thus prepared, it suffices, to weld the two plates together, simply to heat them to a suitable temperature and then immediately to pass them through a pair of rolls 23, 23, set to give the assembled plates a slight reduction as shown, in total thickness, as the plate passes between the rolls in the direction of the arrows, the weld being completed on one first pass through the rolls.

This simple method is limited to plates of metal having substantially the same physical characteristics, for if the two metals differ too much in plasticity at the welding temperature, in coefficient of expansion with heat, or if the two plates are not very thick, or are greatly different in thickness, as subsequent hot or cold rerolling progresses, with consequent further and considerable reduction in thickness, the compound sheets produced are likely not to come out flat, instead, being badly buckled. Also, the welding may be imperfect over considerable areas due to buckling during the first welding pass.

Figure 4:
Figure 4 shows my invention in one form, allowing the simultaneous facing, in one welding operation, of two relatively-thick plates, each with a relatively-thin surfacing.

Figure 4 is an arrangement that avoids this difficulty by introducing an additional feature into the process, and which permits perfect welding of two plates having radically-differing physical characteristics, as in thickness, expansion coefficient, and plasticity. In this case, the two relatively-thick plates 11, 11 may be simultaneously welded, each to one of the two relatively-thin plates 12, 12, the latter having a radically-different coefficient of expansion with temperature, and a differing degree of plasticity at a given temperature, without subsequent buckling resulting. This is accomplished by making the thin plates 11, 11 somewhat shorter than the thick plates 12, 12, and by not attaching either of these thin plates together or to 11, 11, by sealing welding around the edges. Instead, they are simply laid together loose, which in view of the difference in length allows them a small freedom to slide lengthwise on one another, along the contact surfaces to be welded, shown by the thin lines in the drawing, a condition that improves the welding and eliminates buckling to a 100% perfection all over the entire contacting surfaces, regardless of variations in temperature coefficient and plasticity. To make the assembly airtight, it is boxed up by the thin side and end plates of scrap metal, 24, 24, attached by sealing welds as shown at 17, 17, to 11, 11, and at the vertical corners to each other. To prevent welding of the coating sheets 12, 12 to each other, their contacting surfaces with each other, shown by the thick separation line in the drawing, are not polished, and before assembling are given a very thin coating of fine, refractory material, suitable to keep them separate despite the heating and rolling. One of the best coatings for this purpose I have found to be pure magnesia mixed with water containing a little silicate of soda or other inert binder, applied in any suitable manner, as by being sprayed on in a uniform coat with a paint sprayer and allowed to dry. As the best assurance against pinhole contacts between the two plates, it is well to spray both of them. Other materials than magnesia may be used for the coatings, as lime, zirconia, non-silicate clays, and the like, the essential condition being high refractoriness and no tendency to combine with the hot metal. Gas-fixation material is provided, as in the preceding cases, at 15. The reduction of thickness consequent upon the rolling is allowed to buckle the sealing plates 24, 24, somewhat as shown, and if this reduction is not carried too far on the first pass, and if the sealing welds are well done, it will not cause leakage. After the first pass, the welding is completed, so further rolling can go on regardless of airtightness. When the reduction has progressed to the point where the sealing or boxing-in plates 24, 24 have so collapsed or broken off that they no longer serve to tie the assembly together so that it can be handled through the rolls as a unit, it becomes necessary to separate the top pair from the lower pair of laminæ and to conduct further rolling of each separately.

Figure 5:
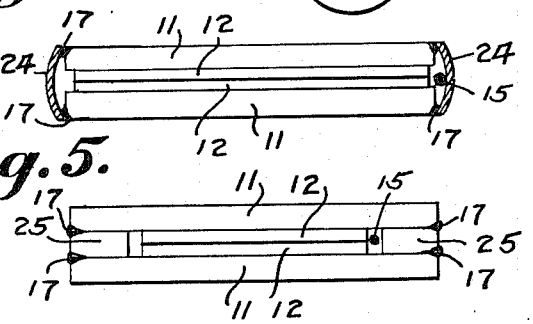
Figure 5 shows my invention in a generally-preferable form, applied to the same use as in Figure 4.

Figure 5 discloses a modification of the assembly that avoids the latter difficulty with the foregoing. In Figure 5, the thin plates 12, 12 are made much shorter than the thick plates 11, 11 and instead of the thin boxing plates 24, 24, of Figure 4, the more substantial side and end filler bars 25, 25, Figure 5, are welded in place to box up the assembly airtight. It remains desirable to allow end movement of the thin plates 12, 12, and the gas-fixation material 15 is provided as before, within the space which allows such end movement. To the welding of many combinations of different metals, of differing expansion coefficients and plasticity values, the provision of space freely to allow endwise slipping and adjustment of the several plates upon one another, as the welding occurs, is the only means that has been found for avoiding buckling during the rolling. Arranged in this way, rerolling, subsequent to the welding on the first pass, can be continued until very thin sheets result, without the assembly coming apart, and without requiring the rolls to contact with any but the soft backing plates 11, 11. Any welding that may occur between the edges of the thin sheets 12, 12, to the filler bars 25, 25, can cause no concern, because all this zone of the original assembly comes off in the final trim, which releases the two laminated sheets from each other and for the first time after the original assembling exposes to view the inner coating plates 12, 12, which remain unwelded to each other throughout an indefinite amount of hot or cold rerolling through any type of sheet or strip mill, if the protective coating sprayed on them has been properly applied. The considerable waste of that portion of the thick sheets 11, 11, which overhangs the ends of the thin sheets 12, 12 is not very serious, because it ordinarily is the case that the thin coating sheets are the expensive and the thick backing sheets the cheap material.

Figure 6:
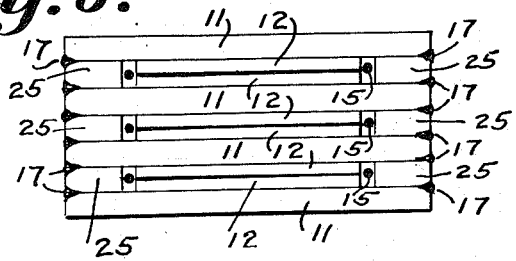
Figure 6 shows my invention as applied to the simultaneous welding of one relatively-thin facing to each of two relatively-thick backing plates, and of two relatively thin facings—on both sides—to each of a plurality (in the example shown, two) of relatively-thick plates.

Figure 6 shows a modification which readily allows at least several tons of metal to be assembled, prepared, and rolled down to relatively-thin sheets as a single unit, which only breaks up into separate sheets when it finally becomes necessary to trim the edges of the sheets as they progress through the rolling. In this case, the whole arrangement is fundamentally the same as that of Figure 5, except that the assembly now is built up of a plurality of sheets—four thick sheets, 11, 11, 11, 11, and six thin sheets, 12, 12, 12, 12, 12, 12, in the particular example illustrated. Prepared as explained in previous paragraphs, rolling this assembly affords two thick sheets on the outside of the assembly, each coated with a thin sheet on one surface; and two thick sheets on the inside of the assembly, each double-coated with two thin sheets.

Figure 7:
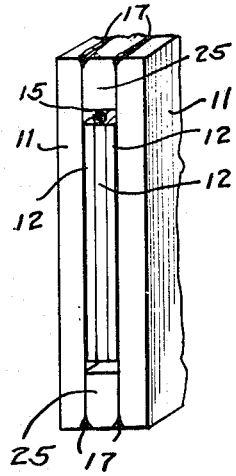
Figure 7 shows my invention applied to a special case of welding three plates together— a relatively-thin one between two thick ones.

Figure 7 illustrates an arrangement of the assembled pack, ready for rolling, which yields a plate of three-ply material, all of metals which are known to be damaging to rolling-mill rolls, but which by my method are prevented from contacting with the rolls while they are being welded and reduced in thickness. Any reasonable number of laminæ in a multiple sheet can be thus welded together, rolled, and rerolled.

My invention thus cheaply and effectively renders available, for a vast variety of manufacturing needs, arts, and processes, a new basic material constituted of unlike qualities of metal, laminated together, or one coated by another, all so intimately welded as to constitute throughout all subsequent handling or fabricating processes one inseparable piece of metal, despite change in analyses, physical properties, and consequent reaction or susceptibility to heat treatment, at the contact face or faces where the welding occurs. Accordingly, for example, iron or steel plates, bars, or sheets, put together by my invention, will be so perfectly welded that hot or cold rolling, or rerolling, blanking, forming, and drawing operations, etc., can be carried on to any limit that the least ductile component of the combination will withstand, absolutely without any separation of the coating or laminæ at the welded faces.

Important specific objects are to compound such items, for example, as armor plate, which my process can provide with the requisite hard face and tough back, made up of two totally different qualities of steels. Thus, for example, the facing steel can be a high-carbon chrome-nickel steel which upon heat treatment will acquire great hardness and the utmost projectile-shattering quality, while the backing steel, for example, can be a very tough, low-carbon chrome-molybdenum steel, which will not harden under the heat treatment, but will retain a maximum resistance to cracking. Yet the intimacy of the welding of the two steel plates into one thicker plate is so perfect that after the welding, bending, finishing, and heat treating, the plate will prove to be one inseparable piece of steel, despite the change in analysis and physical properties at the contact face of the welding. The usual procedure in the fabrication of armor plate, of beginning with a single quality of material, which subsequently is hardened by an elaborate penetration process to a certain depth of case, cannot begin to afford as resistant a product, within a given thickness and weight limitation, as is now made available by my invention.

Hard-faced and soft-backed—or double-faced—steel sheets or plates, for paper and tobacco knives; mowing-machine blades; plowshares, spades, shovels, trowels, forks, and the like; and cutlery and saws; can be cheaply and perfectly fabricated by the process of my invention, so that when the articles mentioned are blanked out of such sheets they can be sharpened so that their cutting edges and working faces will be of the hard surfacing, so resist wear and minimize resharpening, while the soft portion of the sheet will prevent breaking, cracking, and chipping. Thus, a better and cheaper product is made available for such uses.

Another field for my invention is in the application of relatively-thin "corrosion-resistant" surfacings, of nickel or of "stainless" steels, so-called, to bars, tubes, and other shapes, and particularly to plates and sheets, of steels much cheaper than, or possessed of desirable properties not possessed by, the corrosion-resisting covering metal, or steel. From such sheets, for example, cooking utensils can be fabricated in which are combined the virtues of an untarnishable and non-corrosive inner surface, against the food; an outside surface of common black iron, which most readily absorbs the heat of the fire; and a cost much lower than that of articles constituted of "stainless" steel throughout.

For many other applications, such coated sheet, for the fabrication of articles that ordinarily involve the subsequent expense of electroplating, my invention has important uses. This is particularly the case in view of the facts that the thicknesses of coating it affords can be much greater than the practicable thicknesses with electroplating; that the coatings can be of alloys that it is not possible to deposit by electroplating; and that my welded coatings are much more adherent than electroplating.

A great advantage of my invention is that, in its embodiments in which hard or corrosion-resistant steels are contained as inner elements of a packet of laminæ to be welded and rolled, the consequent damage to rolls, and the necessity for expensive rolls of special composition, which is commonly entailed in the rolling of hard steels, manganese and chromium-containing steels, for example, is completely avoided, only the soft outer plates of ordinary steel contacting with the rolls during the welding and subsequent rerolling to reduce thickness.

In its essential features, my invention depends upon the fact that metals, particularly ferrous metals, which corrode or scale when heated to welding temperatures in the presence of air, will remain bright and clean if heated in a vacuum. Consequently, thus heated to a welding temperature, pressing together two contacting surfaces by any suitable means results in a perfect weld, a perfect joining of the two metals, without contamination by oxides or nitrides, and far superior to the best welds that can be made in the presence of air or under the protection of a flux.

Figure 8:
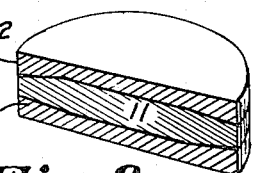
Figures 8 and 9 show my invention adapted to the production of tubes of one material, coated with another.
Figure 9:
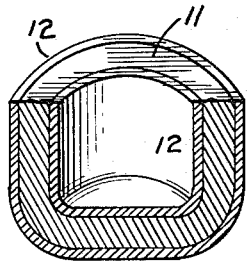

Figures 8 and 9 illustrate an application of my invention to the production of tubing of one quality of metal, which may be coated on the outside, on the inside, or on both sides, with other qualities of metal. To produce such a tube, a suitable sheet is first prepared as shown in section in Figure 8. This is then cupped in a press into the form shown in section in Figure 9, after which it can be cut through the bottom and then be reduced and lengthened over mandrels and through dies, by any of the procedures usual in tube drawing, just as a pierced bar is ordinarily handled in such fabrication. It is to be noted in Figure 8 that it can be easily arranged for both the coating sheets 12, 12, and the inner sheet 11 to be circularly or otherwise machined to non-uniform thickness. Properly done, this allows the cupping operation to draw the tube coatings to uniform thickness.

While I have specifically described my process as applied to welding certain ferrous laminæ together and certain ferrous laminæ with certain non-ferrous laminæ it is to be understood that the modifications of my process to include other weldable metal laminæ in articles in the form of bars, slabs, rods, shafts, plates, armor-plates, sheets, tubes, or the like may be made without departing from the spirit of my invention as described in the claims appended hereto.

Having thus described my invention, what I claim is:

1. The process of producing articles of laminated metal of iron and stainless steel, which consists in forming a plurality of plates of iron of substantially the same lateral dimensions, preparing at least one surface of each plate for welding, placing between said prepared surfaces one or more prepared plates of stainless steel the lateral dimensions of which are substantially smaller than the lateral dimensions of said iron plates, placing a gas fixation material adjacent to said welding surfaces, welding filler elements between said iron plates while maintaining a spaced relation between said filler elements and said stainless steel plates whereby a packet is formed in which said plates are movable relative to each other and the welding surfaces are sealed in an airtight hermetically-sealed container, heating said packet to a temperature at which the gases within said packet are fixed, heating said packet to a welding temperature and subjecting said packet to suitable pressure whereby the prepared surfaces of said plates are welded together in a vacuum without buckling.

2. The process of producing articles of laminated metal of differing chemical or physical compositions which consists in forming a plurality of plates of metal of one composition of substantially the same lateral dimensions, preparing at least one surface of each plate for welding, placing between said prepared surfaces one or more prepared plates of metal of a different composition the lateral dimensions of which are substantially smaller than the lateral dimensions of said first-mentioned plates, placing a gas-fixation material adjacent said welding surfaces, welding filler elements between said first-mentioned plates while maintaining a spaced relation between said filler elements and said second-mentioned plates whereby a packet is formed in which said plates are movable relative to each other and the prepared surfaces are sealed in an airtight hermetically-sealed container, heating said packet to a temperature at which the gases within said packet are fixed, heating said packet to a welding temperature and subjecting said packet to rolling pressure whereby the prepared surfaces of said plates are welded together in a vacuum without buckling.

3. The process of producing articles of laminated metal of differing chemical or physical compositions which consists in making up a plurality of plates of metal of substantially the same lateral dimensions, placing between said plates a plurality of plates the surfaces of which have been prepared for welding, the lateral dimensions of said prepared plates being substantially smaller than said first-mentioned plates, such plates being constituted of metal possessing the property of fixing small quantities of oxygen without the formation of appreciable scale, welding filler elements between said first-mentioned plates while maintaining a spaced relation between said filler elements and said prepared plates whereby a packet is formed containing relatively little air space, in which said prepared plates are movable relative to each other and the prepared surfaces are sealed in an airtight hermetically-sealed container, heating said packet to a temperature at which the oxygen within said packet is fixed, heating said packet to a welding temperature and subjecting said packet to suitable pressure whereby the prepared surfaces of said prepared plates are welded together in the absence of oxygen without buckling.

4. The process of producing articles of laminated metal of differing chemical or physical compositions, which consists in forming a plurality of plates of metal of substantially the same lateral dimensions such plates being constituted of metal possessing the property of fixing small quantities of oxygen without the formation of appreciable scale, placing between said plates a plurality of smaller plates certain of the contacting surfaces of which have been prepared for welding, placing between the other surfaces of said plates a refractory material which prevents welding of those surfaces in contact with the refractory material, welding filler elements between said first-mentioned plates while maintaining a spaced relation between said filler elements and said smaller plates whereby a packet is formed in which said prepared surfaces are movable relative to each other and the prepared surfaces are sealed in an airtight hermetically-sealed container containing relatively little air space, heating said packet to a welding temperature and subjecting said packet to rolling pressure whereby the prepared surfaces of said plates are welded together in the absence of oxygen without buckling.

5. The process of producing articles of laminated metal which consists in forming two plates of substantially the same lateral dimensions, preparing one surface of each of said plates for welding, placing between said prepared surfaces one or more prepared plates of substantially smaller lateral dimensions than said first-mentioned plates, welding filler elements between said first-mentioned plates while maintaining a spaced relation between said filler elements and said prepared plates whereby a packet is formed in which said prepared surfaces may creep relative to each other and in which the prepared surfaces are sealed within an airtight hermetically-sealed container, heating said packet to a welding temperature and subjecting said packet to suitable pressure whereby the prepared surfaces of said plates are welded together without buckling.

6. The process of producing articles of laminated metal which consists in forming two plates of substantially the same lateral dimensions, placing between said prepared surfaces a plurality of smaller plates certain of the contacting surfaces of which are prepared for welding, placing between the other surfaces of said plates a refractory material which prevents welding of those surfaces in contact with the refractory material, welding filler elements between said first-mentioned plates while maintaining a spaced relation between said filler elements and said smaller plates whereby a packet is formed in which said prepared surfaces may creep relative to each other within a hermetically-sealed container formed from said first-mentioned plates and said filler elements, heating said packet to a welding temperature and rolling said prepared surfaces into intimate creeping welding contact with each other.

7. The process of producing articles of laminated metal which consists in forming two plates of substantially the same lateral dimensions, preparing one surface of each plate for welding, placing between said prepared surfaces a plurality of smaller plates certain of the contacting surfaces of which have been prepared for welding such plates being constituted of metal possessing the property of fixing small quantities of oxygen without the formation of appreciable scale, placing between the other surfaces of said plates a refractory material which prevents welding of those surfaces in contact with said refractory material, welding filler elements between said first-mentioned plates while maintaining a spaced relation between said filler elements and said smaller plates whereby a packet is formed in which said prepared surfaces may creep relative to each other within a hermetically-sealed container containing relatively little air space and formed from said first-mentioned plates and said filler elements, heating said packet to a welding temperature and subjecting said packet to suitable pressure whereby the prepared surfaces of said plates are welded together in the absence of oxygen without buckling.

8. The process of producing articles of laminated metal which consists in forming two plates of substantially the same lateral dimension, placing between said plates one or more smaller plates certain of the contacting surfaces of which have been prepared for welding, welding filler elements between said first-mentioned plates while maintaining a spaced relation between said filler elements and said smaller plates whereby a packet is formed in which said prepared surfaces may creep relative to each other within an hermetically-sealed container formed by said first-mentioned plates and said filler elements, heating said packet to a welding temperature and subjecting said packet to rolling pressure whereby said welding surfaces are pressed into intimate creeping welding contact with each other at the welding temperature.

9. The process of producing articles of laminated metal, the laminæ of which are of ferrous and non-ferrous metal, which consists in preparing welding surfaces on the laminæ, placing the welding surfaces contiguous to each other, hermetically sealing the welding surfaces from the atmosphere by joining the laminæ into an assembly packet which permits relative movement of the laminæ within the packet, heating the assembly to a welding temperature and subjecting the packet to suitable pressure whereby the prepared surfaces are pressed into intimate contact with each other with creep between the surfaces which prevents buckling thereof.

10. The process of producing articles of laminated metal the laminæ of which are of ferrous metals of differing physical and chemical characteristics, which consists in preparing welding surfaces on the laminæ, placing the same contiguous to each other, hermetically sealing the welding surfaces from the atmosphere by joining the laminæ into an assembly packet which permits relative movement of the laminæ within the packet, heating the assembly to a welding temperature and rolling the laminæ into intimate creeping welding contact with each other at the welding contact with each other whereby the laminæ are welded together without blistering or buckling.

11. The process of producing articles of laminated metal which consists in preparing welding surfaces on the laminæ, placing the same contiguous to each other, hermetically sealing the welding surfaces from the atmosphere by joining the laminæ into an assembly packet which permits relative movement of the laminæ within the packet, providing therein a suitable gas-fixation material for fixation of the gases within the packet during heating of the packet to a welding temperature and suitably pressing the laminæ into intimate creeping welding contact with each other at the welding temperature.

12. The process of producing coated metal articles which consists in preparing welding surfaces on the article and the coating, placing the welding surfaces in contact with each other, hermetically sealing the prepared surfaces from the atmosphere by sealing the coating upon itself around the article in packet form which permits relative movement of the prepared surfaces, providing therein a suitable gas-fixation material for fixation of the gases within the packet, heating the packet to a welding temperature and pressing the article and coating into intimate creeping welding contact with each other at the welding temperature.

13. The method of welding prepared contacting metal elements together, which consists in sealing the contacting surfaces into an hermetically-sealed assembly packet, providing therein suitable gas-fixation material other than the material of the elements to be welded, for fixation of the gases within the packet during the heating of said packet to a welding temperature, and pressing said elements into intimate creeping contact with each other.

14. The method of welding prepared contacting metal elements together, which consists in sealing the contacting surfaces into an hermetically-sealed assembly packet containing suitable free space to allow end movement, heating said packet to a welding temperature, and suitably pressing said element into intimate creeping contact with each other.

15. The method of welding prepared contacting metal elements together, which consists in sealing the contacting surfaces against ingress of the atmosphere, providing in communication with the contacting surfaces a suitable gas-fixation material other than the material of the elements to be welded, heating the elements to a welding temperature and rolling said elements into creeping welding contact with each other.

16. A packet of metal plates prepared for welding, consisting of outer metal plates, the inner surfaces of each of which have been prepared for welding, welded-in filler plates connecting said outer plates into an hermetically-sealed container, a plurality of plates of substantially smaller lateral dimensions than the interior of said container positioned between said outer plates, each plate having a prepared surface in contact with the prepared surface of the outer plate and a layer of refractory material between said inner plates.

17. A packet of metal plates prepared for welding, consisting of outer metal plates, welded-in filler plates connecting said outer plates into an hermetically-sealed container, a plurality of prepared metal plates of substantially smaller lateral dimensions than the interior of said container positioned between said outer plates with suitable free space to allow end movement, the prepared surfaces of said plates being in frictional contact with each other and free to creep slightly as the packet passes through the rolling mill.

18. A packet of metal plates prepared for welding, consisting of metal plates having prepared welding surfaces hermetically sealed from the atmosphere and adapted to creep into intimate welding contact as said packet is passed through the rolling mill and means within said packet for fixing the gases within said packet at a temperature below the welding temperature of said plates.

19. A packet of metal plates prepared for welding, consisting of outer metal plates, the inner surfaces of each of which have been prepared for welding, welded-in filler plates connecting said outer plates into an hermetically-sealed container, a plurality of plates of smaller lateral dimensions than the interior of said container positioned between said outer plates, each plate having a prepared surface in contact with the prepared surface of the outer plate and a layer of magnesium oxide between said inner plates and means within said packet for withdrawing the gases from between said plates at a temperature lower than the welding temperature of said plates.

20. The process of producing articles of laminated metal which consists in preparing welding surfaces on the laminæ, placing the prepared surfaces together, hermetically sealing the welding surfaces from the atmosphere by joining the laminæ into an assembly packet, providing therein a suitable gas-fixation material other than the material of the elements to be welded for fixation of the gases within the packet during heating of the packet to a welding temperature, and suitably pressing the laminæ into intimate contact with each other at the welding temperature.

RAY ACRE.